US012752984B2

(12) United States Patent
Vovan

(10) Patent No.: US 12,752,984 B2
(45) Date of Patent: Oct. 6, 2026

(54) TAMPER-EVIDENT AND CHILD SAFETY CONTAINER

(71) Applicant: Terry Vovan, Riverside, CA (US)

(72) Inventor: Terry Vovan, Riverside, CA (US)

( * ) Notice: Subject to any disclaimer, the term of this patent is extended or adjusted under 35 U.S.C. 154(b) by 0 days.

(21) Appl. No.: 18/542,522

(22) Filed: Jul. 2, 2024

(65) Prior Publication Data

US 2025/0340342 A1 Nov. 6, 2025

(51) Int. Cl.

| | |
|---|---|
| ***B65D 50/04*** | (2006.01) |
| ***A61J 1/14*** | (2023.01) |
| ***B65D 41/34*** | (2006.01) |
| ***B65D 51/30*** | (2006.01) |

(52) U.S. Cl.

CPC .......... *B65D 50/041* (2013.01); *A61J 1/1418* (2015.05); *B65D 41/34* (2013.01); *B65D 51/30* (2013.01)

(58) Field of Classification Search

CPC .... B65D 50/041; B65D 50/048; B65D 41/34; B65D 41/3428; B65D 51/30; B65D 51/245; B65D 2203/02; B65D 2215/02; B65D 2401/35; A61J 1/1418

USPC ............ 220/200, 254.1, 254.7–254.9, 256.1, 220/259.3–259.5, 260; 215/200–364

See application file for complete search history.

(56) References Cited

U.S. PATENT DOCUMENTS 2,054,012 A * 9/1936 Teller .................. B65D 55/022 220/288
2,054,032 A * 9/1936 Conner ................ B65D 55/022 215/252
2,054,033 A * 9/1936 Conner ................ B65D 55/024 215/252
2,054,034 A * 9/1936 Conner ................ B65D 55/022 215/253
2,124,873 A * 7/1938 Conner ................ B65D 55/024 215/251
2,124,874 A * 7/1938 Conner .................. B65D 41/34 215/251
2,409,846 A * 10/1946 Greene .................. B65D 49/06 215/253

(Continued)

FOREIGN PATENT DOCUMENTS

JP 4452366 B2 * 4/2010
JP 7128508 B2 * 8/2022

*Primary Examiner* — Orlando E Aviles
*Assistant Examiner* — Brijesh V. Patel
(74) *Attorney, Agent, or Firm* — Grants Law Firm; Allan Grant

(57) ABSTRACT

This invention is for a safety child-resistant and tamper-evident packaging container cap having a tamper-evident tab on the top of the cap and a press-tab on the side wall that provides both tamper-evident and child safety features to warn and protect consumers as well as dispensers such as: pharmacists, hospitals, medical centers, and manufacturers that the containers have not been opened and the number of pills contained in the container is accurate. The uniqueness of the cap allows the pharmacist and medical staffs or provider to close it by turning it clockwise, while the patient turns the cap counterclockwise to open it. However, this process will break off the tamper-evident disc away from the outside cap, which indicates tampering and exposes the upper surface of the inner lid, wherein the additional marking displays "OPENED" to warn of tampering.

31 Claims, 11 Drawing Sheets

(56) References Cited

U.S. PATENT DOCUMENTS 2,560,793 A * 7/1951 Greene ................ B65D 55/022 215/252
2,939,597 A * 6/1960 Greene ................ B65D 55/026 215/230
3,445,022 A * 5/1969 Cilluffo ................ B65D 50/046 D9/454
3,722,727 A * 3/1973 Gach .................... B65D 50/041 215/220
3,853,236 A * 12/1974 Ostrowsky ........... B65D 50/041 215/220
3,888,375 A * 6/1975 Gerk .................... B65D 50/041 215/219
4,011,829 A * 3/1977 Wachsmann ......... B65D 50/046 206/534
4,270,664 A * 6/1981 Buono ................. B65D 50/046 215/217
4,378,894 A * 4/1983 Willis .................. B65D 55/066 215/250
4,446,979 A * 5/1984 Gach .................... B65D 55/026 215/211
4,527,701 A * 7/1985 Schaubeck ........... B65D 50/041 215/220
4,528,933 A * 7/1985 Allen ........................ A61J 7/04 215/230
4,632,264 A * 12/1986 Evans .................. B65D 50/041 215/220
4,669,620 A * 6/1987 Coifman .............. B65D 55/024 215/220
4,673,095 A * 6/1987 Puresevic ............ B65D 50/041 215/220
4,705,181 A * 11/1987 Burke .................... B65D 47/06 215/44
5,115,929 A * 5/1992 Buono ................. B65D 50/041 215/230
5,197,616 A * 3/1993 Buono ................. B65D 50/041 215/206
5,261,548 A * 11/1993 Barker ................. B65D 55/022 215/218
5,316,161 A * 5/1994 Gargione ............. B65D 50/041 215/220
5,381,917 A * 1/1995 Santagiuliana ...... B65D 50/041 220/220
5,638,970 A * 6/1997 Garby ................... G06M 1/248 215/230
5,671,853 A * 9/1997 Herr ..................... B65D 50/046 215/221
5,706,963 A * 1/1998 Gargione ............. B65D 50/046 215/217
5,722,546 A * 3/1998 Briere .................. B65D 50/046 215/221
5,819,969 A * 10/1998 Kalodye .............. B65D 55/024 215/901
5,893,473 A * 4/1999 Morris, Sr. .......... B65D 50/041 215/220
5,918,752 A * 7/1999 Meyer .................. B65D 50/041 215/253
6,029,834 A * 2/2000 Sanner ................. B65D 50/041 215/220
6,036,036 A * 3/2000 Bilani .................. B65D 50/046 215/219
6,112,921 A * 9/2000 Robinson ............. B65D 50/046 215/221
D470,051 S * 2/2003 Bloom ........................... D9/453
7,017,762 B2 * 3/2006 Shane .................... B65D 51/24 215/230
7,549,547 B2 * 6/2009 Herr ..................... B65D 55/022 215/351
8,186,526 B2 * 5/2012 Branson ............... B65D 50/041 215/220
8,590,719 B2 * 11/2013 Sprishen .............. B65D 50/041 215/334
9,650,184 B2 * 5/2017 Fily .................... B65D 47/0838
11,299,330 B2 * 4/2022 Lebon .................. B65D 51/244
11,427,387 B2 * 8/2022 Werp, II .............. B65D 50/041
11,498,731 B2 * 11/2022 Lebon .................. B65D 50/041
11,760,545 B1 * 9/2023 Wade ................... B65D 50/041 215/238
2010/0237072 A1 * 9/2010 Ahn ..................... B65D 50/041 220/254.8
2012/0138561 A1 * 6/2012 Brozell ................ B65D 50/041 215/220
2017/0043918 A1 * 2/2017 Guo ....................... B65D 47/18
2018/0099797 A1 * 4/2018 Biesecker Longacre .................... B65D 51/18
2018/0250196 A1 * 9/2018 Warden .................. B65D 41/04
2021/0171249 A1 * 6/2021 Aboabdo ............. B65D 1/0246
2023/0406582 A1 * 12/2023 Bois ..................... B65D 41/005

* cited by examiner

TAMPER-EVIDENT AND CHILD SAFETY CONTAINER

FIELD OF THE INVENTION

This invention relates in general to a safety plastic caps device and method of use, and in particular, the present disclosure relates to a tamper-evident and child-safety packaging containers that are designs to warn and protect consumers as well as dispensers such as: pharmacists, hospitals or medical centers that the container has not been opened.

BACKGROUND OF THE INVENTION

Far too many young children are getting into medicine containers when their parents or caregivers are not looking. US poison control centers receive about 49 calls per hour about medicine poisonings in young children. In fact, every 9 minutes, a young child goes to the emergency department (ED) because they got into a medicine container and took the medicine. Sadly, every hour, a young child is hospitalized because of a medicine poisoning, and every 12 days, a young child dies from the poisoning.

Many safety plastic caps on the market are being designed and used for pharmaceutical packaging containers to prevent children from opening the containers, but they are limited either using the plastic shrink-bands or labels to resolve the tampering evident requirement but neglecting the child safety factor, or vice versa. Particularly, the existing child safety caps present a problem for older people, patients or those that are inflicted with rheumatoid arthritis (RA), Parkinson's disease (PD) or infirmity that required opening the medicine containers by pressing hard on the cap and rotating simultaneously.

The Food and Drug Administration (FDA) defines a tamper evident seal as "having one or more indicators or barriers to entry which, if breached or missing, can reasonably be expected to provide visible evidence to consumers that tampering has occurred." To simplify, if the seal is removed and reapplied, or is broken, it will be obvious to consumers.

A tamper evident system ensures consumers can be confident that the contents have not been altered from the time it is sealed at the manufacturer to the time it reaches the retail shelf. Tamper evident seals are single use, which means that when a seal is broken, it cannot be reapplied.

The top Tamper Evident packaging materials are: (1) Shrink Bands, (2) Over Wrap, (3) Lidding Films, (4) Resealable Stand Up Pouches With Tear Away Lids, (5) Induction Seals, and (6) Tamper Evident Tape. As such, there is a need in the art for an invention that provides a device and method of use that enhances tamper-evident and child safety lid packaging designs to warn and protect consumers as well as dispensers such as: pharmacists, hospitals or medical centers that the package has not been opened.

These tamper-evident (TE) and child-safety (CS) packaging containers are portable and convenient to use, its design consists of a container and lid or cap that contain various products from solids and gels to liquid materials. These tamper-evident (TE) and child-safety (CS) packaging containers are typically made of plastic, glass, metal, composites, or combinations of these materials or the like.

These tamper-evident (TE) and child-safety (CS) packaging containers can be used in the cosmetics, personal care, consumer or industrial products, and pharmaceutical industries where the final products are important to the end users.

These tamper-evident (TE) and child-safety (CS) packaging containers use many-types of fasteners being used such as: snap-on twist lock, clamping mechanisms, thread technologies, adhesive, heat sealing, and ultrasonic welding to keep the assembly of the packaging together.

Most importantly this unique and noble invention can be used with any standard base fastener system that is coupling the cap & container together, and provide a convenience, ergonomic, economic, and aesthetic pleasing container lid that provides a secure closure of the child safety, tamper-evident features and prolongs the product shell life while providing a quick, convenient access to the essential products.

As such, there is a need in the art for an invention that provides a device and method of use that enhances tamper-evident and child safety lid packaging design to warn and protect consumers.

SUMMARY OF INVENTION

Accordingly, it is an object of this invention to provide a child safety package that is tamper-evident to provide a warning and protection to consumers as well as dispensers such as: pharmacists, hospitals or medical centers that the containers have not been opened and the amount of pills contained in the container is accurate.

It is the primary object of the invention is to use an innovative and intuitive tamper-evident and child safety lid packaging design that has a tamper-evident tab on the top of the cap and a press-tab on the side wall that provides both tamper-evident and child safety features to warn and protect consumers.

It is an additional object of the invention in its use to provide a unique cap that allows the pharmacist to close it by turning it clockwise, while the patient turns the cap counterclockwise to open it. However, this process will break off the tamper-evident disc away from the outside cap, which indicates tampering and exposes the upper surface of the inner lid, wherein the additional marking displays "OPENED" to warn of tampering.

It is a further object of this invention to provide not only the pharmacists at the drug stores can use a tamper-evident and child safety packaging container after administering proper medication to the patients, but the manufacturers of medicines, vitamins, cosmetics, etc. can also use these packages to sell the products over the counter to reduce capital expenditures on equipment, materials and potentially mitigate missing medications from delivery or distribution at hospitals or medical centers from the opened container.

It is also an object of this invention to utilize a device that enhances Visual notifications to users that products are safe from tampering, it also increases consumer confidence in your brand. Although tamper evident packaging does not protect the product from being tampered with, it does protect the consumer from using a medication, supplement, or products that has been compromised.

Traditionally, the tamper-evident feature through the heat shrink-band and/or ultrasonic sealing label method can only produce at the manufacturer site, whereas the high cost of equipment is installed; therefore, this method is limited the option of protection at the store level or small businesses that are seeking tamper-evident protection for consumers.

As such, it is still yet another object of this invention to utilize this device that allows for dispensers such as: pharmacists, hospitals or medical centers personal to know that the containers have not been opened and the amount of pills contained in the containers from the manufacturer are accurate.

Furthermore, not only can the pharmacists at the drug stores can use a tamper-evident and child safety packaging container after administering proper medication and number of medication to the patients, but the manufacturers of such medicines, vitamins, cosmetics, etc. can also use these packages to sell the products over the counter to reduce capital expenditures on equipment, materials and potentially mitigate missing medications from delivery or distribution at hospitals or medical centers from the opened container.

The advantages of this invention are evidently unique for consumers by providing an excellent package container with child safety and tamper-evident features that are aesthetically pleasing in appearance and reliable in operation.

It is an object of this invention to create a device that is easy to manufacture, reliable in operation, and relatively inexpensive to produce.

These and further objects of the invention will become apparent to those skilled in the relevant art and after a study of the present disclosure of the invention.

In addition to the above objects, various other objects of this invention will be apparent from careful reading of this specification including the detail description contained herein below.

BRIEF DESCRIPTION OF THE DRAWINGS

These as well as other features of the present invention will become apparent upon reference to the accompanying drawings wherein like numerals designate corresponding parts in the several figures, summarized as follows.

Other features and advantages of the invention will become apparent from the following detailed description, taken in conjunction with the accompanying drawings, which illustrate, by way of example, various features of embodiments of the invention.

DETAIL DESCRIPTION OF PREFERRED EMBODIMENT

The following detailed description and accompanying drawings are provided for purpose of illustrating and describing precisely the preferred embodiments of the present invention and are not intended to limit the scope of the invention in anyway. It will be understood that various changes in the details, materials arrangements of parts or operational conditions which have been herein described and illustrated in order to explain the nature of the invention may be made by those skilled in the art within the principles and scope of this invention.

Figure 1:
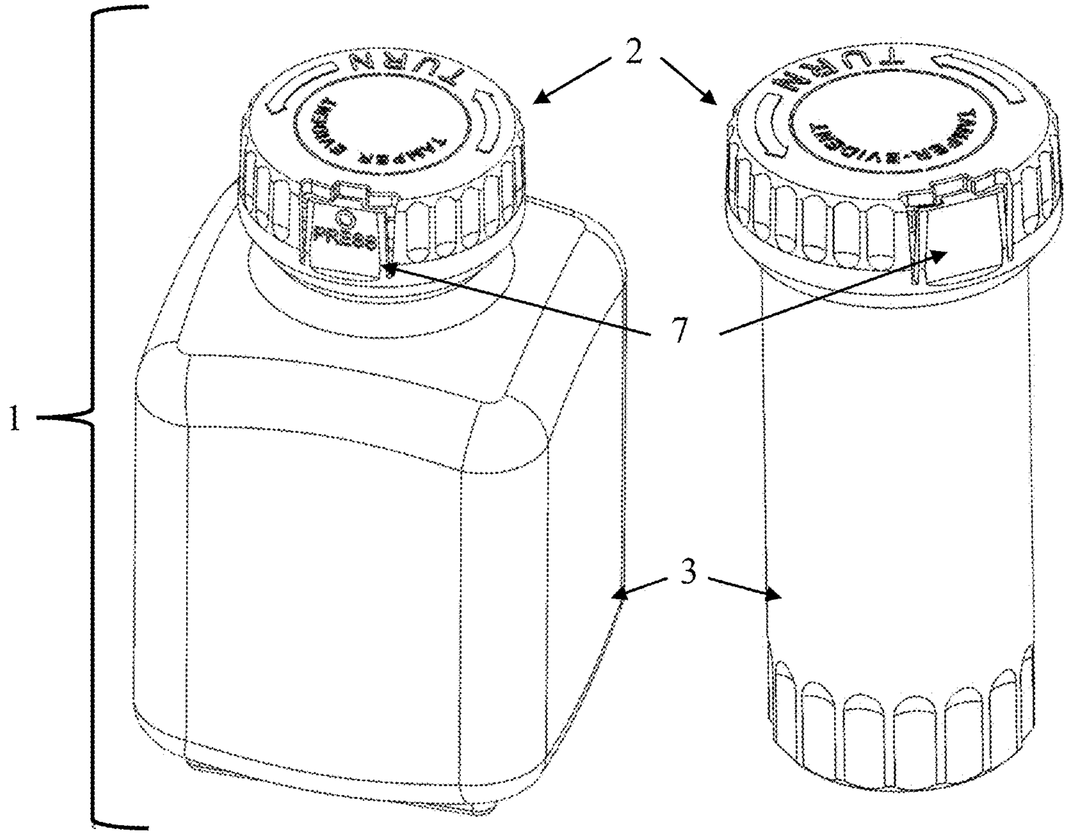
FIG. 1: Exhibits the Container and Cap assembly.
Figure 2:
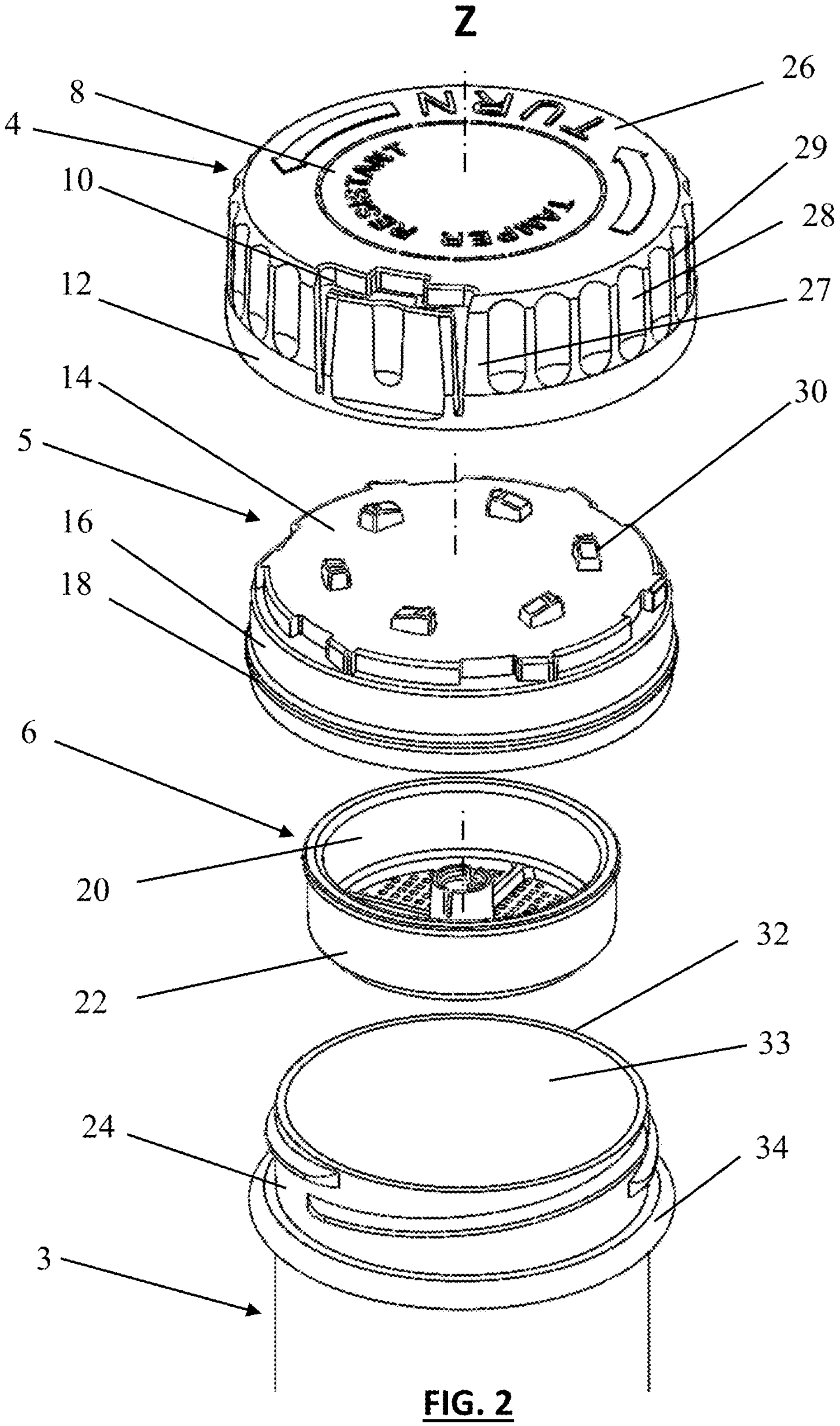
FIGS. 2 & 2*a*: Exhibits an explored view consists of the Outer Lid, Inner Lid, Desiccant Basket and Container.
Figure 2A:
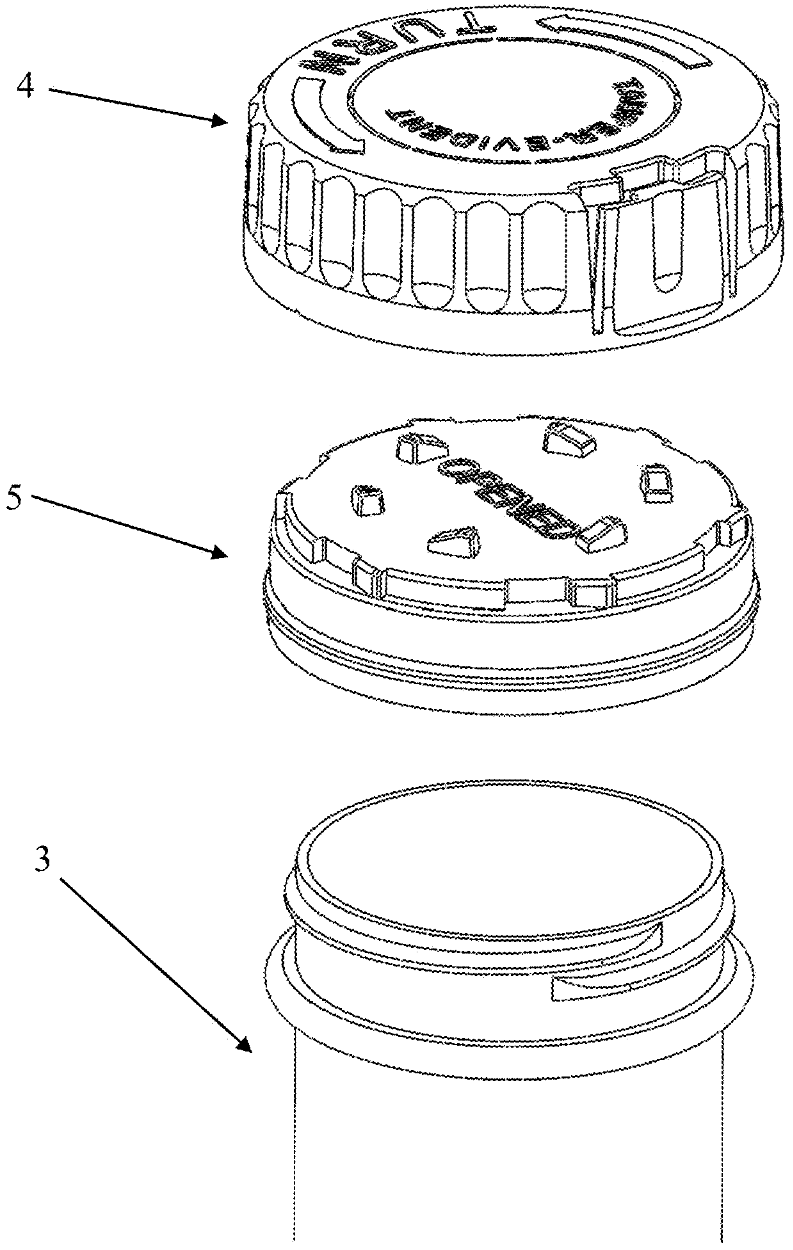

The present invention will be further described in detail below with reference to its preferred embodiment:

Referring to FIGS. 1, 2 & 2*a* of the drawings, present the new invention of a tamper-evident and child-safety plastics packaging container is described through the illustrations. Based on this embodiment, the tamper-evident and child-safety packaging container (1) includes a cap assembly (2) attachable to the plastics or glass container (3). The cap assembly consists of two-components: the outer lid (4), the inner lid (5), and the desiccant basket (6). The outer lid has a push-tab (7) attached to the circular bottom wall (12) by two-hinged joint (118) on each side of the pivotal hinge (120) and spaced from the upper wall (26) by a clearance slot (10); an upper wall (26) of the outer lid is attached to a center tamper-evident disc (8), while the opposing side has multiple vertical outer wall (27), vertical serration grippers (28) and an outer vertical wall (29) radially surrounding the outer lid provide a positive hand gripping. The inner lid (5) has an upper wall (14) whereas the lower beads (30) are located radially from the center Z axis of the inner lid, and the vertical sidewall (16) and the radial retainer (18) define the outer wall of the inner lid. A desiccant basket (6) has an inner surface (20) and an outer surface (22) to fit the cavity of the below inner lid. FIG. 2 shows without the desiccant basket, which is an optional component to prolong the shelf-life of the products or medicines when it is applied. A plastics or glass container (3) can be made in various shapes and sizes with the cavity inner wall (33) and the container outer wall (24) jointed by the container rim (32). A neck ring (34) is located below the male fastener that prevents tampering from prying, and an array of gripping recesses is located below of the round or square container wall (24) to facitate the opening of the packaging container.

Figure 3:
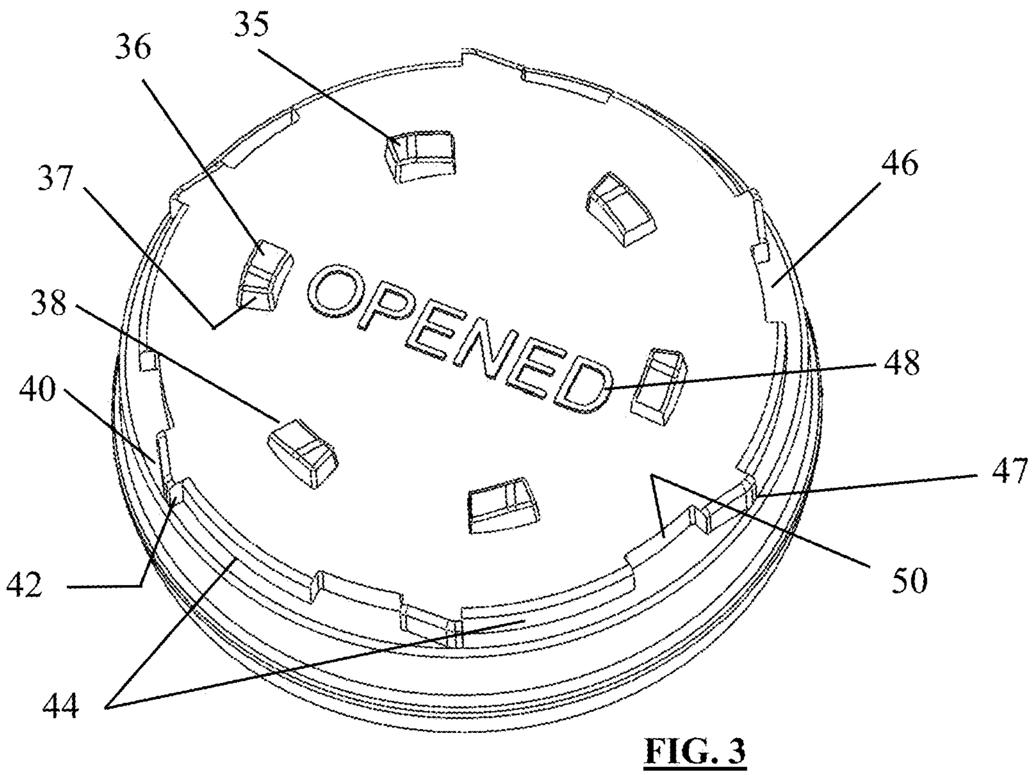
FIG. 3: Exhibits the top view of the Inner Lid.
Figure 4:
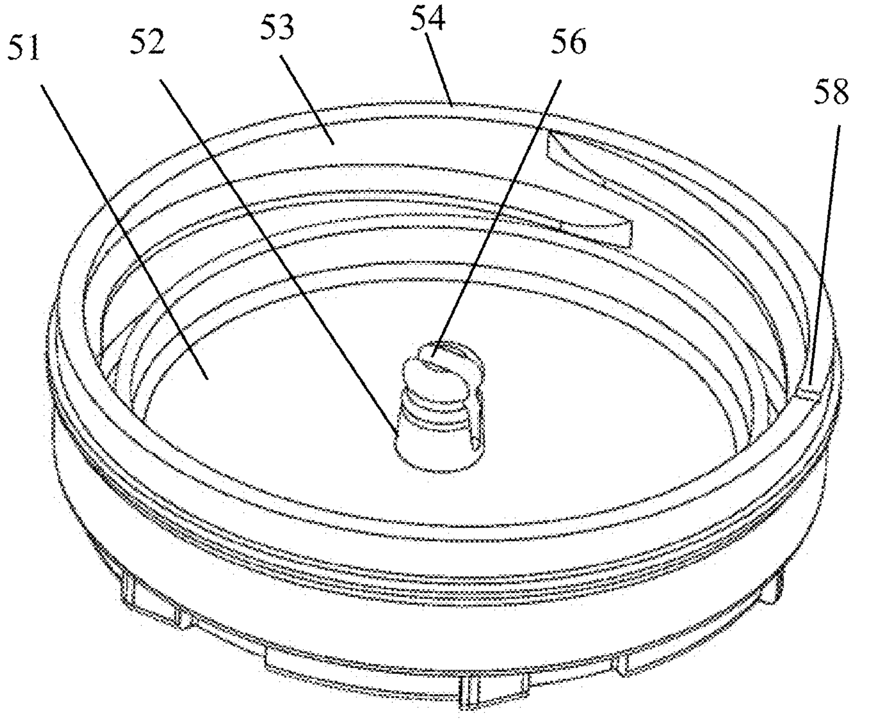
FIG. 4: Exhibits an inverted view of the Inner Lid with a Center Snap-on Post, and assembled marking on the rim.

Referring to FIGS. 3 & 4 of the drawings, a tamper-evident and child-safety plastics packaging container has an inner lid (5) of the cap assembly, wherein the upper wall has a bead ramp (36) and bead front wall (38), and a tamper-evident text warning (48) can be marked, molded, or printed. Adjacent to the upper wall is a vertical wall (44), a horizontal ramp (40), and a frontal wall (42) to facilitate counterlockwise when the outer lid rotates and functionally indexed as a child safety feature. However, the horizontal ramp crest (96) (FIG. 7) protrudes slightly outward, allowing the outer lid easy to rotate clockwise when closing and tightening the cap assembly (2). FIG. 4 shows an inverted view of the inner lid, wherein the cavity bottom wall (51) has a snap-on base (52) with a collapsible slot (56) attaching to the desiccant basket. The bottom rim (54) has at least an alignment mark (58) to assist in the assembly of the inner and the outer lid, while the inner lid vertical wall (53) has a female fastener (136) system or connection such as a twist-lock, screwed, threaded, etc. configuration that is compatible and coupling with the plastic or glass container (3).

Figure 5:
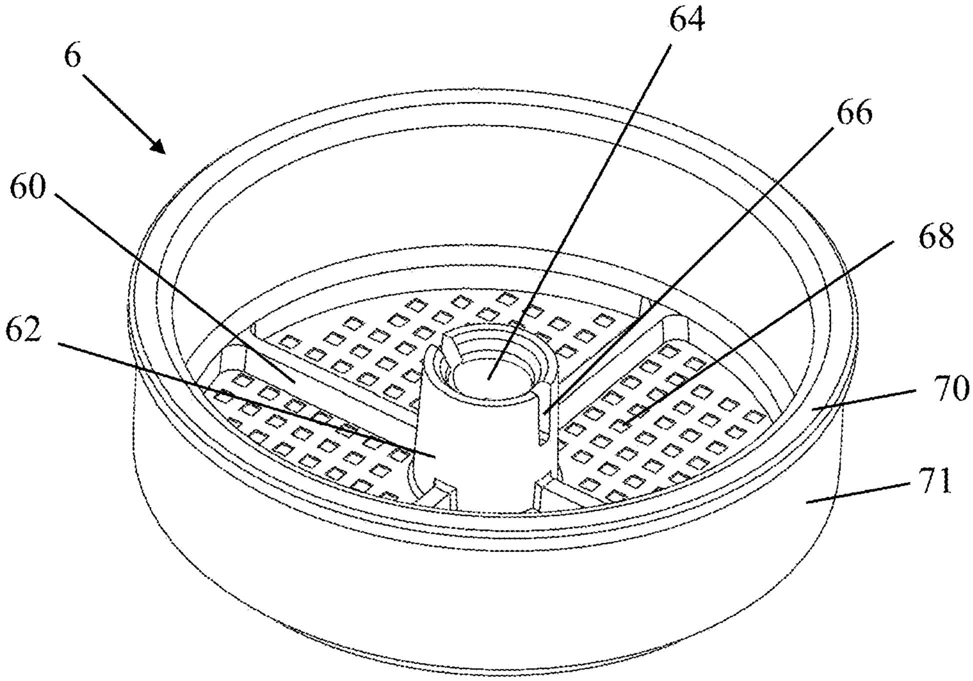
FIGS. 5 & 5*a*: Exhibits a Desiccant Basket with a Center Snap-on Post, including the support ribs and the transmission holes.
Figure 5A:
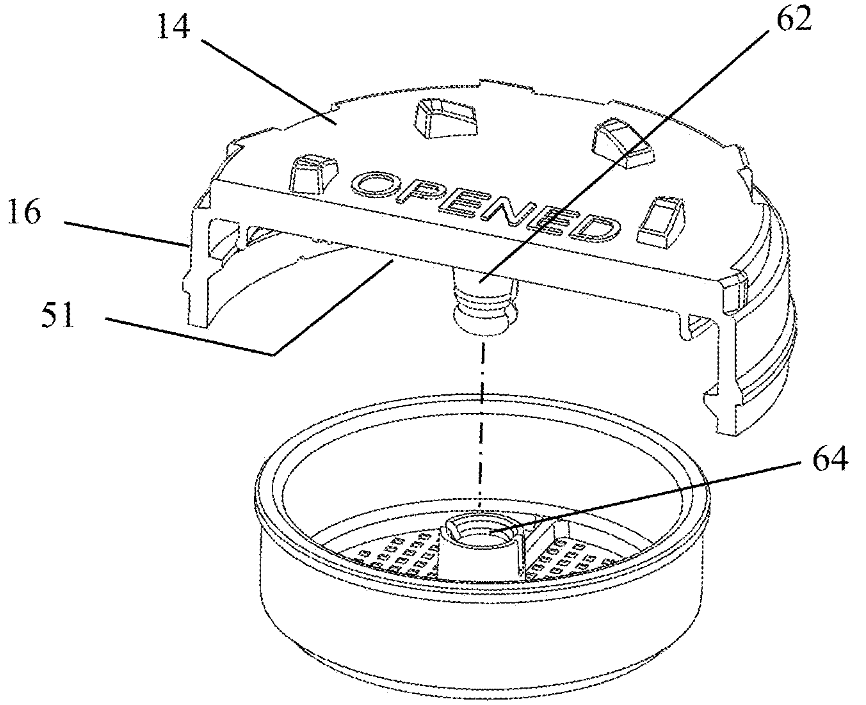
Figure 6:
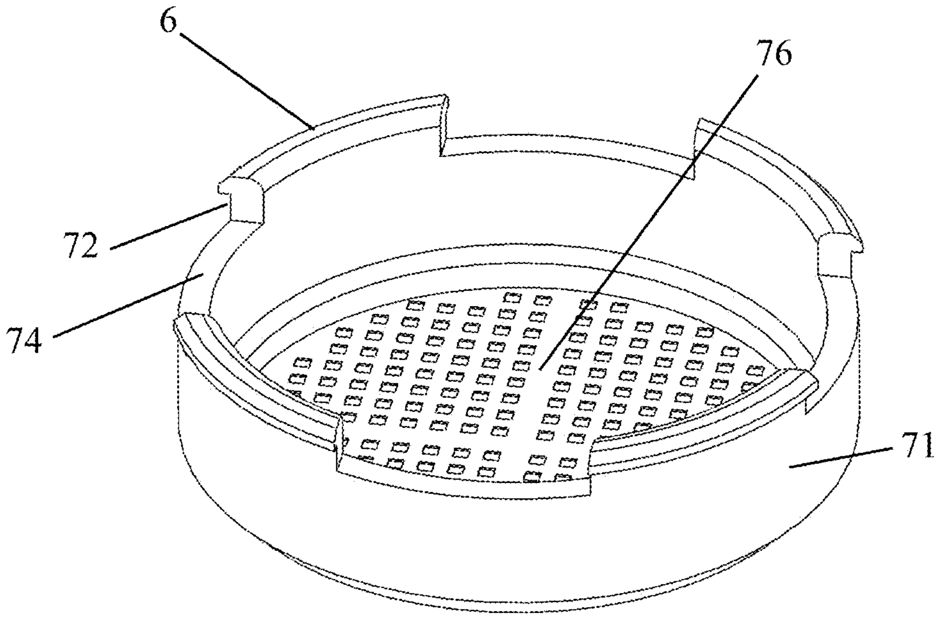
FIG. 6: Exhibits a Desiccant Basket with perimeter Snap-lock and bottom wall having the transmission holes.

Referring to FIGS. 5, 5*a* & 6 of the drawings, a tamper-evident and child-safety plastics packaging container, a desiccant basket (6) has a bottom wall (76) and support ribs (60) connecting to the internal surface and the center post snap-on (62) with the internal cavity (64) wherein a through slot (66) protrudes through the sidewall of the post to provide the flexibility for the snap-on feature. The perimeter rim (70) connects to the outer wall (22) to provide the rigidity of the desiccant basket when it is rested against the bottom wall of the inner lid. FIG. 5*a* exhibits the alignment of the snap-lock between the center post (62) and the snap-on base (52). FIG. 6 of the drawing, the perimeter rim (70) has released slots (74) that form the external snap-on (72) feature that are mated with the cavity of the inner lid.

Figure 7:
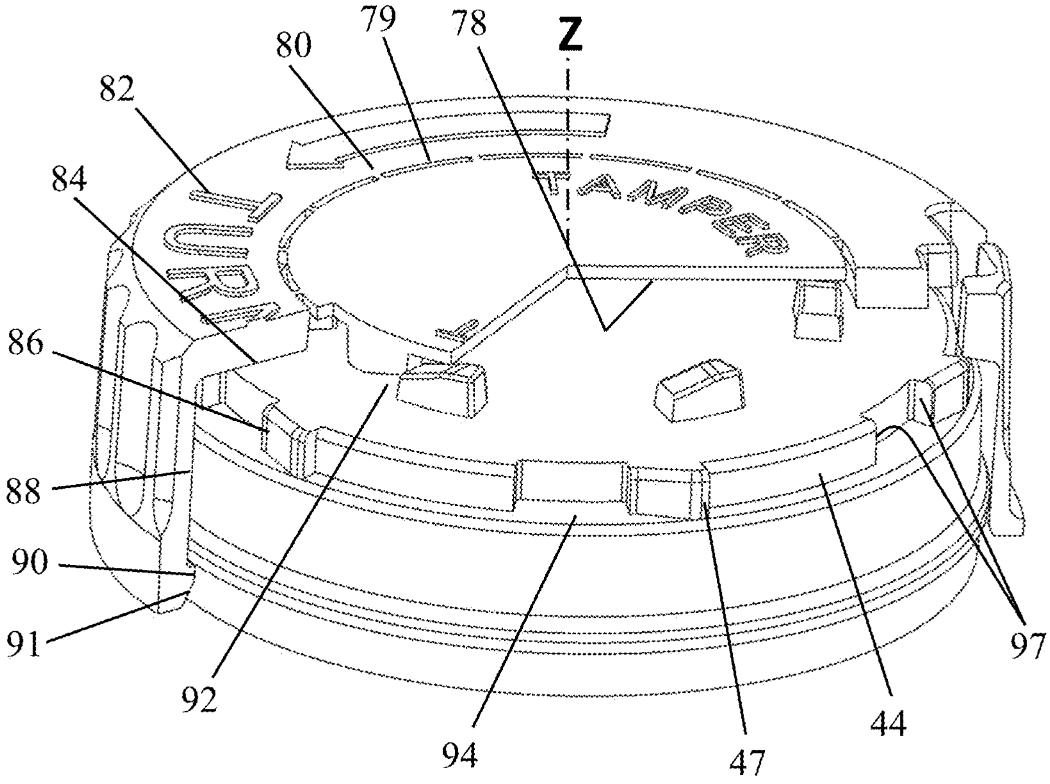
FIGS. 7 & 7*a*: Exhibit a partial section of the Outer Lid and the opening process of breaking the frangible joint by turning the cap counterclockwise, and wedging between the beads to eject the Tamper-Evident Disc from the Cap.
Figure 7A:
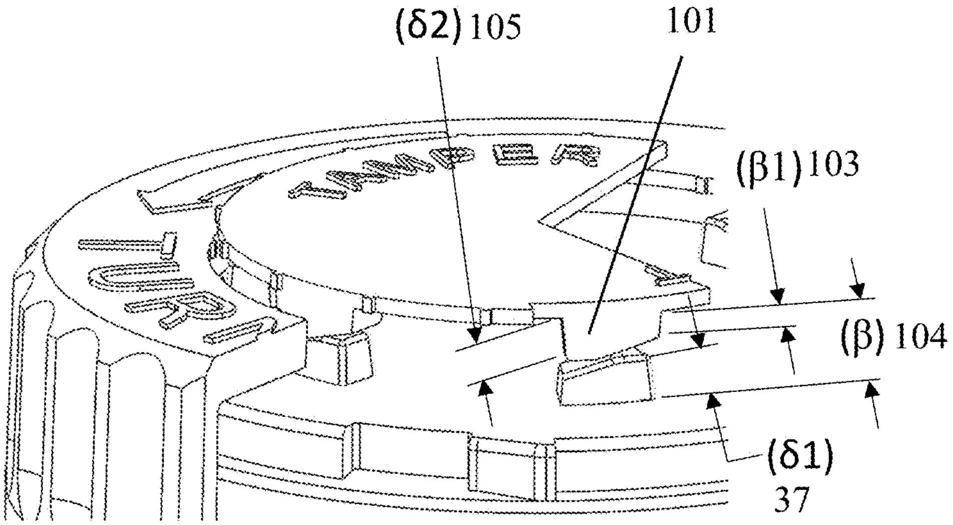

Referring to FIGS. 7 & 7*a* of the drawing, a tamper-evident and child-safety plastics packaging container has a partial cross-section of the outer lid (4) being cut to show the detailed components and functionality of the cap assembly (2) when the cap rotates about the center Z axis. The outer lid has an upper wall (28) that can be marked or molded with instructional guidance (82) for opening the container, and it connects to a center tamper-evident disc (8) by the frangible joint (80). The bottom surface (78) of the tamper-evident disc is a thin section of material where the upper beads (101) are located circularly and rotationally aligned with the lower beads (30, FIG. 3) from the center Z axis. These bead configurations have matching angles (92) of the bead ramps, whereas the upper ramp (106) of the tamper-evident disc (and the lower ramp (110) of the inner lid are wedged against each other to break the frangible joint and raise up the tamper-evident disc when rotated counterlockwise to open the container. The bottom surface (84) is slightly spaced from the upper wall (14) of the inner lid, providing sufficient clearance for these lids to rotate freely. Below the upper wall (14) of the inner lid is a ledge surface (94) connecting to the vertical sidewall (16) and a circular ring (18). The vertical outside wall (44), a closing ramp (86), the horizontal ramp crest (96), and the recess sidewall (97) are located between the upper wall (14) and the ledge surface to facilitate closing the packaging container. The cylidrical wall (88) and radial retaining ring (90) hold the inner lid and the outer lid together, while the leading chamfer (91) is used foreasing the assembly process.

Figure 8:
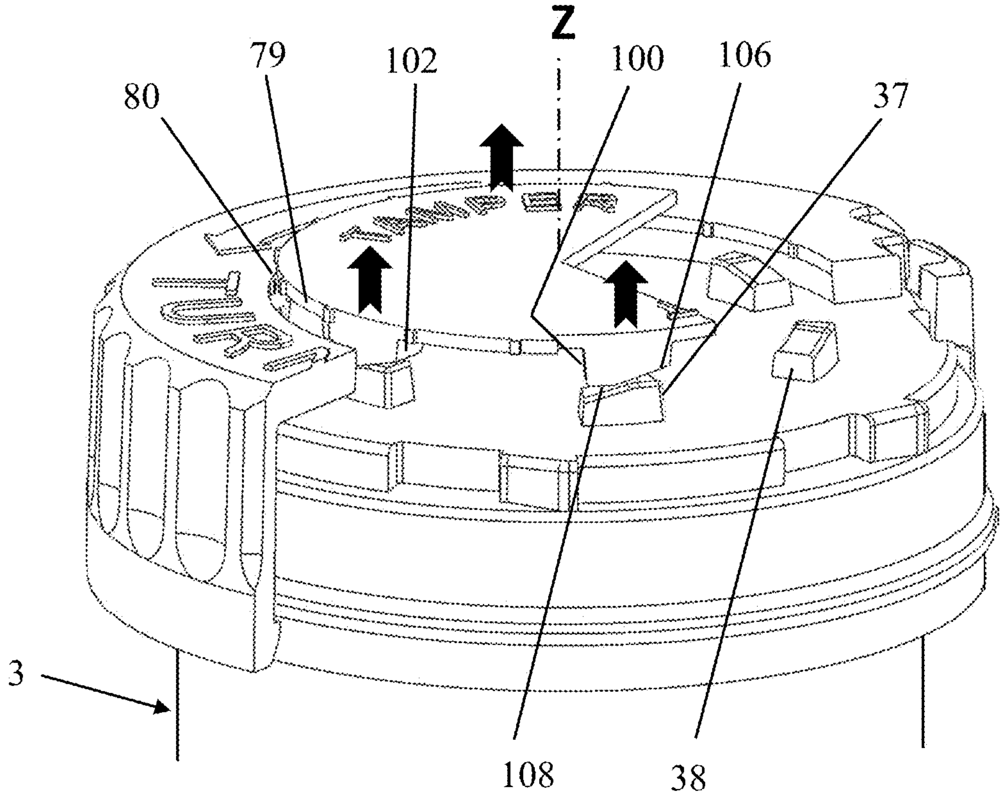
FIG. 8: Exhibits the Tamper-Evident Disc ejected after breaking frangible joint by turning the Cap in a normal opening action.
Figure 9:
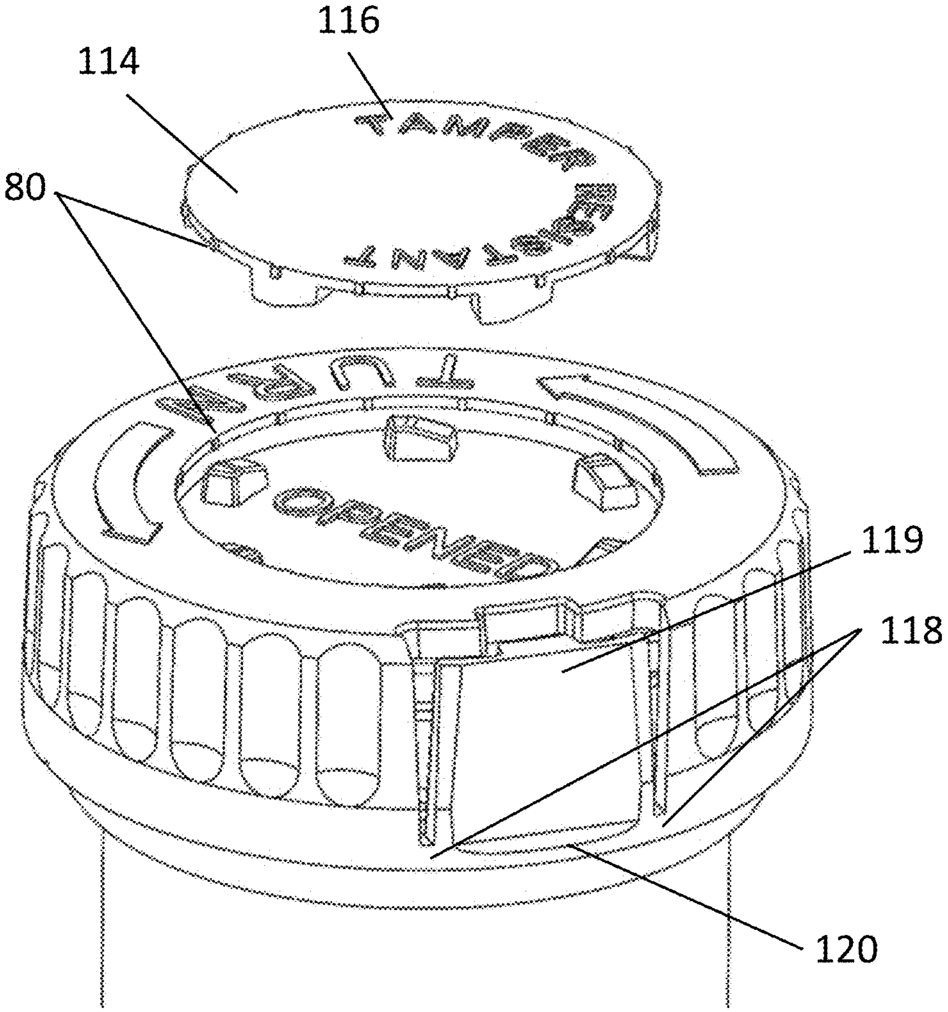
FIG. 9: Exhibits the Tamper-Evident Disc breaking away from the Outer Cap and exposed the Cap, wherein the marking of "OPEN" on the top surface of the Inner lid provides the warning tampering. The cap continue functions as a child safety container.

Referring to FIGS. 8 & 9 of the drawings, similarly to FIG. 7, a partial cross-section of the outer lid (4) shows the detailed components and functionality of the plastics cap assembly, wherein the outer cap is being rotated counter-clockwise for opening, the bead upper ramp (106) of the tamper-evident disc (8) wedging against the bead lower ramp (110) until both of these ramps reach the bead upper surface (98) of the inner lid and the bead upper surface (104). The frangible joint (80) are broken during this opening process, and the tamper-evident disc (8) is separated and ejected away from the outer lid. The bead front wall (102) and the bead rear walls (100) of the tamper evident disc, and the frontal wall (112) and the rearmost wall (108) are positioned in such a way that prevents them from colliding when closing the. packaging container. In FIG. 9 of the exploded drawing, the tamper-evident disc has the instructional text (116) on the top upper wall (114) with marking or molding of the tamper-evident, wherein the tamper-evident is separated and exposed to the upper wall and warning of the inner lid. A push-tab is located on the sidewall of the outer lid and attached by two hinged joint (118) between the pivotal hinge (120).

Figure 10:
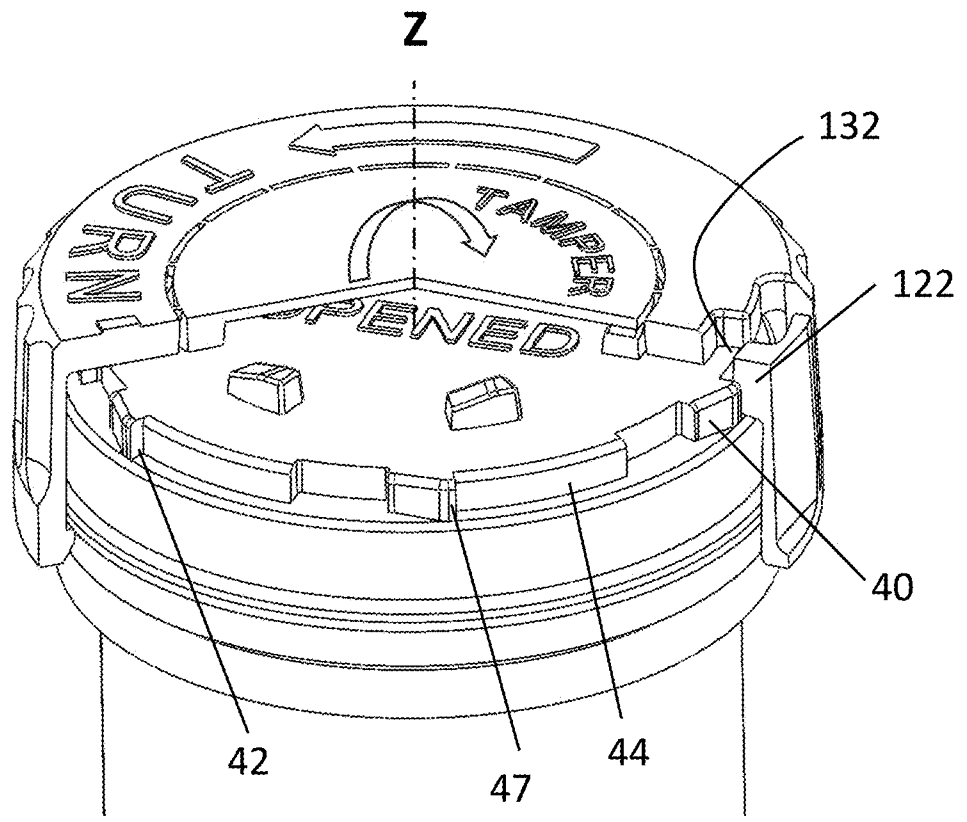
FIG. 10: Exhibits the closing and tightening of the Cap, wherein the vertical sidewall of the Press-Tab is pressing against the frontal wall of the inner lid to tighten the Cap.
Figure 11:
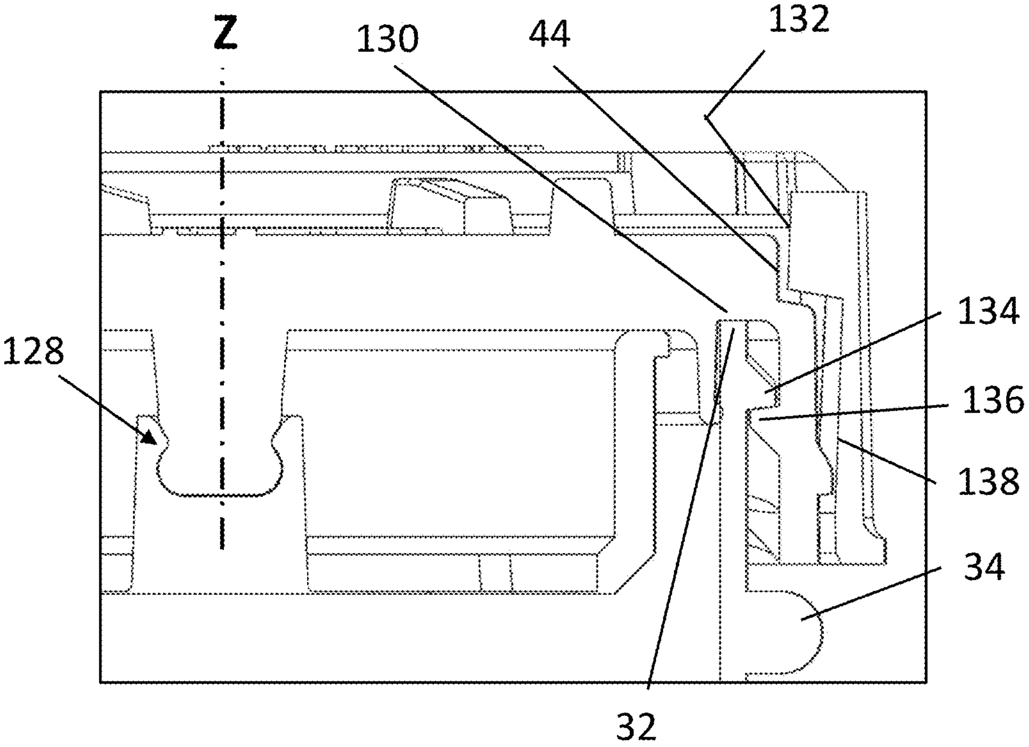
FIGS. 11 & 11*a*: Exhibits a cross-section of the package container, wherein the snap-on center post connecting the Desiccant Basket to the bottom of the Inner Lid, and the shut-off between the container rim to the ceiling wall, and clearance gap between vertical upper wall of the inner lid and the frontal wall of the press-tab. It also exhibits a female & male fastening system (twist-lock/screws/threads) keeps the cap and container together, and the lip seal provides a secondary seal between inside of the inner lid and the container.
Figure 11A:
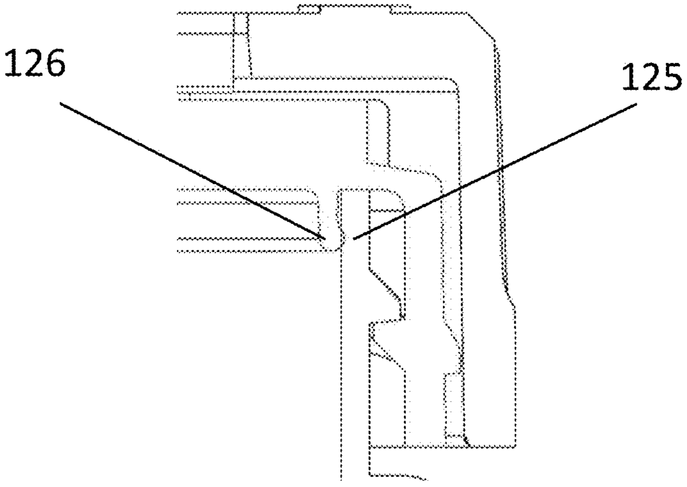

Referring to FIGS. 10 & 11 of the drawings, a tamper-evident and child-safety plastic packaging container with a partial cross-section of the outer lid (4) is being cut to show the detailed components and functionality of the cap assembly (2). When the cap rotates clockwise about the center Z axis, the top sidewall (122) of the push-tab is pressed against the frontal wall (42) of the inner lid in a neutral position to close and tighten the cap. By turning the cap counterclockwise, the frontal wall (132) of the push-tab is spaced from the vertical wall (44), and it is intermittently pressed against the ramp crest (124) of the inner lid. FIG. 11 is a full cross section that also exhibits the primary sealing of the surface (32) of the container rim and the ceiling wall (130) of the inner lid. The secondary lip seal (126) of the inner lid circularly presses against the inner wall (33) of the container to provide a positive seal, the lip seal (126) has a spherical radius or having a radius surface more than 90 degrees [see FIG. 11*a*] to prevent the transmission of the elements into the container. A standard fastener method of the female fastener (136) and male fastener (134) type, or the like twist lock, threaded, screwed type, etc., can be used to keep the cap assembly (2) and container (3) coupling together, while the neck ring (34) prevents tampering.

Figure 12:
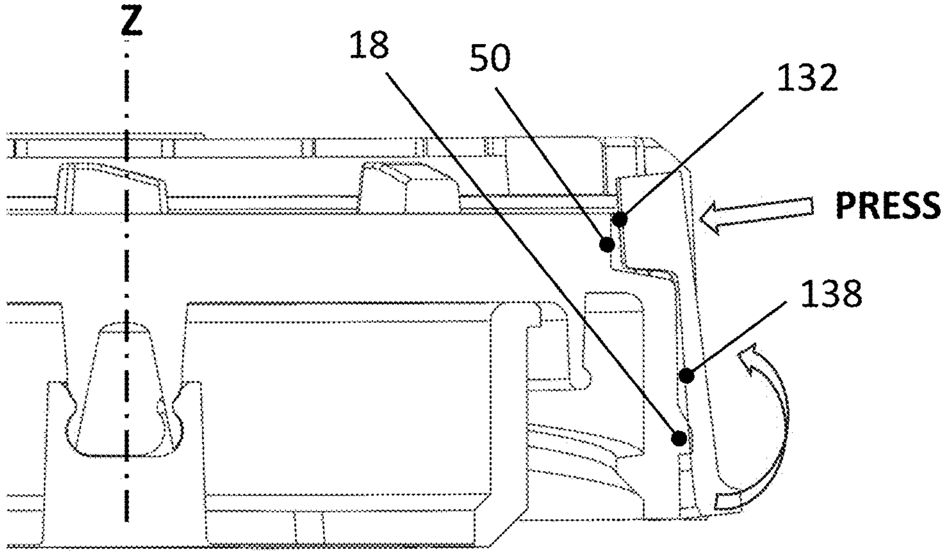
FIG. 12: Exhibits pressing the upper side of the press-tab wherein the frontal wall toward close to the recess frontal wall, and the sidewall of the press-tab resting against the recess side wall of the inner lid. In addition, it exhibits the press-tab pressing against the radial retainer, which tends to deflect the press-tab back to the upright neutral position.

Referring to FIG. 12 of the drawing, a tamper-evident and child-safety plastics packaging container, a cross-section shows without the container, wherein the pressure is being applied by the finger pressing on the top portion of the push-tab (7), so the frontal wall (132) is enganged within the recess groove (46) and flexed toward the recess frontal wall (50), causing the outer lid and inner lid to connect together for unfastening of the cap. The vertical sidewall (138) of the push-tab (7) is pressed against the circular ring (18) of the inner lid, which allows it to flex back to the neutral vertical position when the finger is released.

A child-resistant packaging container comprising: a container (3) having an inner wall (33) that connects to an outer wall (24) by a container rim (32), and is coupled to a cap assembly having a male fastener (134); said cap assembly (2) comprises:

- an outer lid (4) having an upper wall (26) connecting to an outer vertical outer walls (27) and one or more serration grippers (28) jointing with a circular bottom wall (12) that forms a cavity of said outer lid, wherein said outer lid having at least an upper bead (101) adjacent bottom surface (84) that connects to the cylindrical wall (88) and a radial retaining ring (90), whereas said vertical outer wall (27) and said serration grippers (28) facilitate opening of the package container easily;
- said outer lid (4) has a push-tab (7) connecting by two hinged joint (118) on each side of the pivotal hinge (120) said resiliently keeping said push-tab (7) in its vertical neutral position after multiple usages of pressing;
- an inner lid (5) has an upper wall (14) wherein at least a bead (30) is located radially from the center axis and adjacent to a vertical upper wall (44), wherein one or more horizontal ramps (40), frontal vertical walls (42) and recess frontal walls (50) are connected; and said inner lid (5) has a vertical sidewall (16) with a radial retainer (18) that is located adjacent to a bottom rim (54) and connecting to an inner vertical wall (53), wherein the female fastener (136) is affixed.

A child-resistant packaging container, wherein the container is engageable with said cap assembly, wherein said cap assembly (2) having a two-component assembly comprising: said inner lid (4) is covered by said outer lid (5), and retained together by a radially spaced retainer (18) and said retaining ring (90), and is rotatable about the center Z axis of the cap assembly.

A child-resistant packaging container, further comprising: a desiccant basket having a bottom wall (76) connects to a support rib (60) and a center post having a snap-on feature that is attachable to a snap-on base (52) of said inner lid (5), whereas said snap-on has a collapsible slot (56) to facilitate the installation.

A child-resistant packaging container, wherein said desiccant basket (6) is attached to the bottom wall (51) of the inner lid (5) and the bottom wall (76) of the desiccant basket has at least a transmission hole that connects to the vertical outer wall (22) and a perimeter rim (70) to maintain its rigidity.

A child-resistant packaging container, wherein said desiccant basket (6) has a perimeter rim (70) with an external snap-on (72) and a released slot (74) for ease of assembly.

A child-resistant packaging container, wherein the bottom wall (51) of the inner lid (5) presses against the container rim (32) creating a preliminary seal of a ceiling wall (130), while a lip seal (126) presses against an internal wall (33) of the neck, creating a secondary seal to prevent transmission of air or liquid from the environment when the packaging container is closed.

A child-resistant packaging container, wherein said lip seal (126) has a spherical radius or a radius surface greater than 90 degrees to provide a smooth engagement between the cap assembly (2) and inner wall (33) of said container (1).

A child-resistant packaging container, wherein a neck ring (34) is located below the male fastener (134) to prevent prying.

A child-resistant packaging container, further comprising tamper-evident features has a frontal wall (132) of said push-tab (7) is slightly spaced from said vertical upper wall (44) of the inner lid (5) in a neutral vertical position.

A child-resistant packaging container, wherein the lid assembly (2) is made from the polymer materials selected of: thermoplastics, thermoset, non-ferrous and/or composite thereof.

A child-resistant packaging container comprising: a container (3) having an inner wall (33) that connects to an outer wall (24) by a container rim (32), and is coupled to a cap assembly by the male fastener (134); said cap assembly (2) comprises:

an outer lid (4) having an upper wall (26) connecting to an outer vertical outer walls (27) and one or more serration grippers (28) jointing with a circular bottom wall (12) that forms a cavity of said outer lid, wherein said outer lid having at least an upper bead (101) adjacent bottom surface (84) that connects to the cylindrical wall (88) and a radial retaining ring (90), whereas said vertical outer wall (27) and said serration grippers (28) facilitate opening of the package container easily;

said outer lid (4) has a push-tab (7) connected by two hinged joint (118) on each side of a pivotal hinge (120) that said resiliently keeping said push-tab (7) in its vertical neutral position after multiple times of pressing;

an inner lid (5) has an upper wall (14), a ledge surface (94) that extends outwardly and radially connecting to at least: a horizontal ramp (40), a frontal vertical wall (42), a recess frontal wall (50), and a vertical upper wall (44), whereas a small clearance gap separates between said vertical upper wall (44) and frontal wall (132) of said push tab (7), thereby allowing the outer lid to rotate about the center Z axis; and said inner lid (5) has a vertical sidewall (16) with a radial retainer (18) that is adjacent to a bottom rim (54) and connects to the inner vertical wall (53) whereas said female fastener (136) is affixed.

A child-resistant packaging container, further comprising a neck ring (34) is located below a male fastener (134) to prevent of prying.

A child-resistant packaging container, wherein said push-tab is being pressed on, causing said frontal wall (132) of the push-tab (7) to move forward within a recess groove (46) and a recess frontal wall (50) of said inner lid (5), thereby allowing them to latch and circumferentially rotate counter-clockwise together to open the packing container.

A child-resistant packaging container, further comprising a top sidewall (122) of said push-tab (7) is spaced against said frontal wall (42) of the inner lid in a neutral position when the outer lid is rotated clockwise without pressing the push-tab, thereby allowing the outer lid to close and tighten the packaging container.

A child-resistant packaging container, further comprising said frontal wall (132) of the push-tab (7) to radially pushed against the vertical wall (44), horizontal ramp (40), and the horizontal ramp crest point (96) of the inner lid, which causes said push-tab (7) to intermittently pivot outward just slightly when it is rotated counterclockwise of the cap assembly.

A child-resistant packaging container, further comprising the frontal wall (132) of the push-tab (7) is slightly spaced from said vertical upper wall (44) of the inner lid in a neutral: vertical position.

A child-resistant packaging container, wherein said inner lid (5) has said inner vertical wall (53) adjacent to a bottom wall (51) wherein the inner lip seal (126) prevents transmission of elements into the container.

A child-resistant packaging container in claims 11, wherein the lid assembly (2) is made from the polymer materials selected of: thermoplastics, thermoset, non-ferrous and/or composite thereof.

A child-resistant and tamper-evident packaging container comprise: a container (3) is connectable to the cap assembly (2); a cap assembly (2) comprises:

an outer lid (4) has an upper wall (26) connecting to a tamper-evident disc (8) by, at least, a frangible joint (80), wherein the bottom surface (78) has an upper bead (101) radially aligned with a lower bead (30) of the inner lid, wherein the bead has at least a ramp wedging together to break a frangible joint and said to separate the tamper-evident disc from the outer lid;

said outer lid (4) has an upper wall (26) adjacent to an outer vertical wall (27) and a serration gripper (28) and a circular bottom wall (12) that connects to the push-tab (7) by two hinged joint (118) on each side of a pivotal hinge (120), thereby resiliently keeping a push-tab (7) in its vertical neutral position after multiple usages of pressing;

said outer lid (4) has a cylindrical wall (88) adjacent to a radially retaining ring (90), wherein a snap-on feature retains the inner lid (5) together by a radial spaced retainer (18) and can rotate about the center Z axis;

an inner lid (5) has an upper wall (14) and has at least a lower bead (30) that is rotationally aligned with an upper bead (101) of said tamper-evident disc; and said outer lid (4) and said inner lid (5) are co-radially assembled by snapping said outer lid and said inner lid together and are rotatable counterclockwise about the center Z axis, thereby allowing a horizontal ramp (40) and a horizontal ramp crest (49) on a ledge surface (94) are intermittently pressed against a vertical inside wall (138) of said push-tab (7) to prevent unintentional opening of the package container as a child-resistant feature.

A child-resistant and tamper-evident packaging container, wherein a bead upper ramp (106) of said tamper-evident disc (8) and a bead lower ramp (110) of the inner lid (5) are rotationally wedged against each other to break the frangible joint, wherein said tamper-evident disc (8) is raised upward above the upper wall (26), and falling off.

A child-resistant and tamper-evident packaging container, wherein said tamper-evident disc (8) is severely broken and separated from the cap assembly (2) before the push-tab (7) engages with a recess groove (46) of the inner lid (5).

A child-resistant and tamper-evident packaging container, wherein the tamper-evident disc (8) is separated from the cap assembly (2), wherein the "opened" warning (48) marking on the upper surface (14) indicates tampering to consumers.

A child-resistant and tamper-evident packaging container, wherein the cap assembly (2) is continuously functioned as a child-safety packaging container until pressing on said push-tab (7) to open the packaging container.

A child-resistant and tamper-evident packaging container, wherein said upper wall (26) of the outer lid (4) is printed, engraved, or molded with opening instructions for consumers.

A child-resistant and tamper-evident packaging container in claim 19, wherein a frontal wall (132) of the push-tab (7) is slightly spaced from a vertical upper wall (44) of the inner lid (5) in a neutral vertical position.

A child-resistant and tamper-evident packaging container, wherein said inner lid (5) has an inner vertical wall (53) adjacent to a bottom wall (51) wherein an inner lip seal (126) prevents transmission of elements into the container.

A child-resistant and tamper-evident packaging container, wherein an upper lid has a minimum of 3 frangible joint (80) for connecting said outer lid (4) to said tamper-evident disc (8).

A child-resistant and tamper-evident packaging container, wherein the lid assembly (2) is made from the polymer materials selected of: thermoplastics, thermoset, non-ferrous and/or composite thereof.

A child-resistant and tamper-evident packaging container (1) comprises:

a container (3) having an inner wall (33) is connected to the outer wall (24) by a container rim (32), and a neck ring (34) is located below the male fastener (134);

an outer lid (4) has an upper wall (26) connecting to the tamper-evident disc (8) by frangible joint, wherein said outer lid (4) has a outer vertical wall (27), one or more serration grippers (28) and a circular bottom wall (12) to facilitate opening said container (3) by rotating the cap assembly (2) counterclockwise to break and separate the tamper-evident disc (8) from the outer lid (4);

said inner lid (5) has an upper wall (14) and said outer lid (4) has a bottom surface (78), each having at least an opposing bead ramp to rotationally break the frangible joint and raise the tamper-evident disc (8) away from the outer lid (4);

said outer lid (4) has a push-tab (7) connecting to a circular bottom wall (12) by two hinged joint (118) on each side and spaced by a resilient pivotal hinge (120) to maintain the upper push-tab in a vertical upright position;

said inner lid (5) has an inner vertical wall (53) adjacent to a bottom wall (51) wherein an inner lip seal (126) prevents transmission of elements into the container; and said inner lid (5) has said inner vertical wall (53) wherein the female fastener (136) is located and coupled to the male fastener (134) of the container to prevent prying.

A child-resistant and tamper-evident packaging container, wherein said container cap assembly (2) has a marking for a tampered warning (48) or instructional guidance (82) for consumers on how to open the packaging container.

A child-resistant and tamper-evident packaging container, wherein said upper lid has a minimum of 3 frangible joint (80) connecting said outer lid portion (4) to said tamper-evident disc (8).

A child-resistant and tamper-evident packaging container, wherein the lid assembly (2) is made from the polymer materials selected of: thermoplastics, thermoset, non-ferrous and/or composite thereof.

While the description above refers to particular embodiments of the present invention, it will be understood that many modifications may be made without departing from the spirit thereof. The presently disclosed embodiments are therefore to be considered in all respects as illustrative and not restrictive.

I claim:

1. A child-resistant packaging container comprising:

a container having an inner wall that connects to an outer wall by a container rim, and is coupled to a cap assembly having a male fastener;

said cap assembly comprises:

an outer lid having an upper wall connecting to an outer vertical wall and one or more serration grippers joined with a circular bottom wall that forms a cavity of said outer lid, wherein said outer lid has at least an upper bead adjacent to its bottom surface that connects to a cylindrical wall and a radial retaining ring, and wherein said outer vertical wall and said serration grippers facilitate opening of the child-resistant packaging container easily;

said outer lid has a push-tab connected by two hinged joints on each side of a pivotal hinge, said hinge resiliently keeping said push-tab in its vertical neutral position after multiple usages;

an inner lid has an upper wall wherein at least one bead is located radially from the center axis and adjacent to a vertical upper wall, wherein one or more horizontal ramps, frontal vertical walls and recess frontal walls are connected;

said inner lid has a vertical sidewall with a radial retainer that is located adjacent to a bottom rim and connects to an inner vertical wall, wherein a female fastener is affixed;

wherein the container is engageable with said cap assembly, wherein said cap assembly is a two-component assembly comprising: said inner lid covered by said outer lid, and retained together by a radially spaced retainer and said retaining ring, and rotatable about a center Z axis of the cap assembly; and a desiccant basket having a bottom wall connected to a support rib and a center post having a snap-on feature that is attachable to a snap-on base of said inner lid, wherein said snap-on feature has a collapsible slot to facilitate the installation.

2. The child-resistant packaging container of claim 1, wherein said desiccant basket is attached to a bottom wall of the inner lid and the bottom wall of the desiccant basket has at least one transmission hole that connects to the vertical outer wall and a perimeter rim to maintain its rigidity.

3. The child-resistant packaging container of claim 1, wherein said desiccant basket has a perimeter rim with an external snap-on and a release slot for ease of assembly.

4. The child-resistant packaging container of claim 1, wherein the bottom wall of the inner lid presses against the container rim creating a preliminary seal at a ceiling wall, while an inner lip seal presses against an internal wall of the neck, creating a secondary seal to prevent transmission of air or liquid from the environment when the child-resistant packaging container is closed.

5. The child-resistant packaging container of claim 4, wherein said inner lip seal has a spherical radius or a radius surface greater than 90 degrees to provide a smooth engagement between the cap assembly and the inner wall of said container.

6. The child-resistant packaging container of claim 1, wherein a neck ring is located below the male fastener to prevent prying.

7. The child-resistant packaging container of claim 1, further comprising tamper-evident features wherein a frontal wall of said push-tab is slightly spaced from said vertical upper wall of the inner lid in a neutral vertical position.

8. The child-resistant packaging container of claim 1, wherein the lid assembly is made from polymer materials selected from the group consisting of: thermoplastics, thermosets, non-ferrous metals, or composites thereof.

9. A child-resistant packaging container comprising:

a container having an inner wall that connects to an outer wall by a container rim, and is coupled to a cap assembly by a male fastener;

said cap assembly comprises:

an outer lid having an upper wall connecting to an outer vertical wall and one or more serration grippers joined with a circular bottom wall, thereby forming a cavity of the outer lid, wherein said outer lid has at least an upper bead that is located on a bottom surface connected to a cylindrical wall and a radial retaining ring, wherein said outer vertical wall and said serration grippers facilitate opening of the child-resistant packaging container;

said outer lid has a push-tab connected by two hinged joints on each side of a pivotal hinge that resiliently keeps said push-tab in its vertical neutral position after multiple pressings;

an inner lid has an upper wall, a ledge surface that extends outwardly and radially connecting to at least: a horizontal ramp, a frontal vertical wall, a recess frontal wall, and a vertical upper wall, wherein a small clearance gap separates said vertical upper wall and the frontal wall of said push-tab, thereby allowing the outer lid to rotate about a center Z axis; and said inner lid has a vertical sidewall with a radial retainer that is adjacent to a bottom rim and connects to an inner vertical wall, wherein a female fastener is affixed; and a desiccant basket having a bottom wall connected to a support rib and a center post having a snap-on feature that is attachable to a snap-on base of said inner lid, wherein said snap-on feature has a collapsible slot to facilitate the installation.

10. The child-resistant packaging container of claim 9, wherein said desiccant basket is attached to the bottom wall of the inner lid and the bottom wall of the desiccant basket has at least one transmission hole that connects to the vertical outer wall and a perimeter rim to maintain its rigidity.

11. The child-resistant packaging container of claim 10, wherein said desiccant basket has a perimeter rim with an external snap-on and a release slot for ease of assembly.

12. The child-resistant packaging container of claim 9, further comprising a neck ring located below the male fastener to prevent prying.

13. The child-resistant packaging container of claim 9, wherein said push-tab, when pressed, causes said frontal wall of the push-tab to move forward within a recess groove and a recess frontal wall of said inner lid, thereby allowing the outer lid and inner lid to latch and circumferentially rotate counterclockwise together to open the child-resistant packaging container.

14. The child-resistant packaging container of claim 9, further comprising wherein a top sidewall of said push-tab is spaced against the frontal wall of the inner lid in a neutral position when the outer lid is rotated clockwise without pressing the push-tab, thereby allowing the outer lid to close and tighten the child-resistant packaging container.

15. The child-resistant packaging container of claim 9, further comprising wherein the frontal wall of the push-tab is radially pushed against the vertical wall, horizontal ramp, and the horizontal ramp crest point of the inner lid, which causes said push-tab to intermittently pivot outward slightly when it is rotated counterclockwise with the cap assembly.

16. The child-resistant packaging container of claim 9, further comprising wherein the frontal wall of the push-tab is slightly spaced from said vertical upper wall of the inner lid in a neutral vertical position.

17. The child-resistant packaging container of claim 9, wherein said inner lid has an inner vertical wall adjacent to a bottom wall, wherein an inner lip seal prevents transmission of elements into the container.

18. The child-resistant packaging container of claim 9, wherein the lid assembly is made from polymer materials selected from the group consisting of: thermoplastics, thermosets, non-ferrous metals, or composites thereof.

19. A child-resistant and tamper-evident packaging container comprising:

a container connectable to a cap assembly;

wherein said cap assembly comprises:

an outer lid having an upper wall connecting to a tamper-evident disc by at least a frangible joint, wherein the bottom surface has an upper bead radially aligned with a lower bead of the inner lid, wherein the beads have at least one ramp for wedging together to break the frangible joint and thereby separate the tamper-evident disc from the outer lid;

said outer lid has an upper wall adjacent to an outer vertical wall and a serration gripper and a circular bottom wall that connects to the push-tab by two hinged joints on each side of a pivotal hinge, thereby resiliently keeping the push-tab in its vertical neutral position after multiple usages;

said outer lid has a cylindrical wall adjacent to a radial retaining ring, wherein a snap-on feature retains the inner lid together by a radially spaced retainer and the lids can rotate about the center Z axis;

an inner lid has an upper wall and has at least a lower bead that is rotationally aligned with the upper bead of said tamper-evident disc; and said outer lid and said inner lid are co-radially assembled by snapping said outer lid and said inner lid together and are rotatable counterclockwise about the center Z axis, thereby allowing the horizontal ramp and the horizontal ramp crest on a ledge surface to be intermittently pressed against a vertical inside wall of said push-tab to prevent unintentional opening of the the child-resistant and tamper-evident packaging container as a child-resistant feature; and a desiccant basket having a bottom wall connected to a support rib and a center post having a snap-on feature that is attachable to a snap-on base of said inner lid, wherein said snap-on feature has a collapsible slot to facilitate the installation.

20. The child-resistant and tamper-evident packaging container of claim 19, wherein said desiccant basket is attached to the bottom wall of the inner lid and the bottom wall of the desiccant basket has at least one transmission hole that connects to the vertical outer wall and a perimeter rim to maintain its rigidity.

21. The child-resistant and tamper-evident packaging container of claim 19, wherein said desiccant basket has a perimeter rim with an external snap-on and a release slot for ease of assembly.

22. The child-resistant and tamper-evident packaging container of claim 19, wherein the upper ramp of the tamper-evident disc and the lower ramp of the inner lid are rotationally wedged against each other to break the frangible joint, wherein said tamper-evident disc is raised upward above the upper wall and falls off.

23. The child-resistant and tamper-evident packaging container of claim 19, wherein said tamper-evident disc is broken and separated from the cap assembly before the push-tab engages with a recess groove of the inner lid.

24. The child-resistant and tamper-evident packaging container of claim 19, wherein the tamper-evident disc is separated from the cap assembly, and wherein the "opened" warning marking on the upper surface indicates tampering to consumers.

25. The child-resistant and tamper-evident packaging container of claim 19, wherein the cap assembly continues to function as a child-resistant and tamper-evident packaging container until the push-tab is pressed to open the child-resistant and tamper-evident packaging container.

26. The child-resistant and tamper-evident packaging container of claim 19, wherein said upper wall of the outer lid is printed, engraved, or molded with opening instructions for consumers.

27. The child-resistant and tamper-evident packaging container of claim 19, wherein a frontal wall of the push-tab is slightly spaced from a vertical upper wall of the inner lid in a neutral vertical position.

28. The child-resistant and tamper-evident packaging container of claim 19, wherein said inner lid has an inner vertical wall adjacent to a bottom wall, wherein an inner lip seal prevents transmission of elements into the container.

29. The child-resistant and tamper-evident packaging container of claim 19, wherein the outer lid has a minimum of 3 frangible joints for connecting said outer lid to said tamper-evident disc.

30. The child-resistant and tamper-evident packaging container of claim 19, wherein the lid assembly is made from polymer materials selected from the group consisting of: thermoplastics, thermosets, non-ferrous metals, or composites thereof.

31. A child-resistant and tamper-evident packaging container comprising:

a container having an inner wall connected to the outer wall by a container rim, and a neck ring located below the male fastener;

an outer lid having an upper wall connecting to the tamper-evident disc by at least one frangible joint, wherein said outer lid has an outer vertical wall, one or more serration grippers and a circular bottom wall to facilitate opening the container by rotating the cap assembly counterclockwise to break and separate the tamper-evident disc from the outer lid;

said inner lid has an upper wall and said outer lid has a bottom surface, each having at least one opposing bead ramp to rotationally break the frangible joint and raise the tamper-evident disc away from the outer lid;

said outer lid has a push-tab connected to a circular bottom wall by two hinged joints on each side and spaced by a resilient pivotal hinge to maintain the push-tab in a vertical upright position;

said inner lid has an inner vertical wall adjacent to a bottom wall, wherein an inner lip seal prevents transmission of elements into the container;

said inner lid has an inner vertical wall wherein a female fastener is located and coupled to the male fastener of the container to prevent prying;

a desiccant basket having a bottom wall connected to a support rib and a center post having a snap-on feature that is attachable to a snap-on base of said inner lid, wherein said snap-on feature has a collapsible slot to facilitate the installation;

wherein said desiccant basket is attached to the bottom wall of the inner lid and the bottom wall of the desiccant basket has at least one transmission hole that connects to the vertical outer wall and a perimeter rim to maintain its rigidity; and wherein said desiccant basket has a perimeter rim with an external snap-on and a release slot for ease of assembly.

* * * * *